United States Patent
Lisin et al.

(10) Patent No.: US 10,077,541 B2
(45) Date of Patent: Sep. 18, 2018

(54) MOVABLE PIPELINE-SUPPORT AND SUPPORT ASSEMBLY THEREOF

(71) Applicants: Public Joint Stock Company "Transneft", Moscow (RU); Joint-stock company "Transneft Siberia", Tyumen (RU); L.L.C. "Transneft Research and Development Institute for Oil and Oil Products Transportation", Moscow (RU)

(72) Inventors: Yury Viktorovich Lisin, Moscow (RU); Yurii Borisovich Mikheev, Moscow (RU); Valeriy Vyacheslavovich Bondarenko, Chelyabinsk (RU); Vitaly Ivanovich Surikov, Balashikha (RU); Vladimir Ivanovich Fedota, Moscow (RU); Alexander Nikolaevich Chentsov, Moscow (RU)

(73) Assignees: PUBLIC JOINT STOCK COMPANY "TRANSNEFT", Moscow (RU); JOINT-STOCK COMPANY "TRANSNEFT SIBERIA", Tyumen (RU); LIMITED LIABILITY COMPANY "TRANSNEFT RESEARCH AND DEVELOPMENT INSTITUTE FOR OIL AND OIL PRODUCTS TRANSPORTATION", Moscow (RU)

(*) Notice: Subject to any disclaimer, the term of this patent is extended or adjusted under 35 U.S.C. 154(b) by 0 days.

(21) Appl. No.: 15/226,889

(22) Filed: Aug. 2, 2016

(65) Prior Publication Data
US 2016/0340859 A1 Nov. 24, 2016

Related U.S. Application Data

(63) Continuation of application No. PCT/RU2014/000216, filed on Mar. 28, 2014.

(51) Int. Cl.
*E02D 31/14* (2006.01)
*F16L 3/16* (2006.01)
(Continued)

(52) U.S. Cl.
CPC .............. *E02D 31/14* (2013.01); *E02D 27/12* (2013.01); *E02D 27/35* (2013.01); *E02D 27/46* (2013.01);
(Continued)

(58) Field of Classification Search
CPC . F16L 3/1091; F16L 3/16; F16L 57/00; F16L 57/02; F16L 57/06; F16L 1/026; F16L 1/028; E02D 31/14
(Continued)

(56) References Cited

U.S. PATENT DOCUMENTS

| 492,593 A | 2/1893 | Taylor |
| 1,470,529 A | 10/1923 | Gerber |

(Continued)

FOREIGN PATENT DOCUMENTS

| CA | 1232255 | 2/1988 |
| CN | 201071981 | 6/2008 |

(Continued)

OTHER PUBLICATIONS

Herbert E. Lindberg; "*Alaska Pipeline in Fairbanks*"; http://lindbergIce.com/alaska/alaska2.htm ; posted Aug. 21, 2000; (7 pages).

(Continued)

*Primary Examiner* — Paola Agudelo
(74) *Attorney, Agent, or Firm* — One LLP; Jonathan Jaech

(57) ABSTRACT

The disclosure relates to the construction of a support for above-ground pipelines and can be used for laying pipelines in in permafrost and on slopes. The result of the support is (Continued)

uniform distribution of the load from the pipeline to a bedding cradle, displacement of a movable part in response to predetermined conditions, and prevention of deformation due to soil heaving. The result is achieved due to inclusion of moving and fixed parts. The movable part includes a semi-cylindrical cradle with two semi-annular frames on the outside of the cradle, detachable half-yokes fix the pipe in the cradle, side cheeks welded to the frame and movably fixed to the tower base by a hinged joint, and a base slidably positioned on a stationary surface of the support. The objective is also solved using a support assembly being structurally different than prior art supports, as described herein.

8 Claims, 5 Drawing Sheets

(51) Int. Cl.

| | | |
|---|---|---|
| F16L 3/10 | (2006.01) | |
| E02D 27/12 | (2006.01) | |
| E02D 27/35 | (2006.01) | |
| E02D 27/46 | (2006.01) | |
| E02D 31/08 | (2006.01) | |
| F16L 57/00 | (2006.01) | |
| F16L 57/02 | (2006.01) | |
| F16L 57/06 | (2006.01) | |
| F16L 59/21 | (2006.01) | |
| F16L 1/026 | (2006.01) | |

(52) U.S. Cl.
CPC ............ *E02D 31/08* (2013.01); *F16L 3/1091* (2013.01); *F16L 3/16* (2013.01); *F16L 57/00* (2013.01); *F16L 57/02* (2013.01); *F16L 57/06* (2013.01); *F16L 59/21* (2013.01); *F16L 1/026* (2013.01)

(58) Field of Classification Search
USPC ......................................................... 248/55
See application file for complete search history.

(56) References Cited

U.S. PATENT DOCUMENTS

| | | | |
|---|---|---|---|
| 1,703,605 A | 2/1929 | Ballantyne | |
| 1,906,209 A | 4/1933 | Harding et al. | |
| 2,151,321 A | 3/1939 | Glover | |
| 2,533,370 A | 12/1950 | Haug | |
| 2,561,540 A | 7/1951 | Sherbrooke | |
| 2,846,168 A | 8/1958 | Schroeter | |
| 3,026,076 A | 3/1962 | Bender | |
| 3,168,114 A | 2/1965 | Martin | |
| 3,298,644 A | 1/1967 | Sherburne | |
| 3,390,854 A | 7/1968 | Sherburne | |
| 3,863,679 A | 2/1975 | Young | |
| 3,963,205 A * | 6/1976 | Hageman | F16L 3/00 |
| | | | 248/55 |
| 4,128,219 A * | 12/1978 | Kaigler, Jr. | F16L 1/026 |
| | | | 248/49 |
| 4,139,142 A * | 2/1979 | Maple | F16L 3/16 |
| | | | 228/175 |
| 4,140,292 A | 2/1979 | Kaigler, Jr. | |
| 4,244,543 A | 1/1981 | Ericson | |
| 4,343,497 A | 8/1982 | Bot | |
| 4,403,759 A | 9/1983 | Hicks | |
| 4,445,656 A | 5/1984 | Leitch | |
| 4,530,478 A | 7/1985 | McClellan | |
| 4,787,583 A | 11/1988 | Morton | |
| 4,804,158 A | 2/1989 | Collins et al. | |
| 4,826,113 A | 5/1989 | Winters | |
| 5,028,019 A | 7/1991 | Hardtke | |
| 5,102,073 A | 4/1992 | Lestenkof, Jr. | |
| 5,163,642 A | 11/1992 | Torrens et al. | |
| 5,749,548 A | 5/1998 | Tamura et al. | |
| 5,924,656 A | 7/1999 | Okada et al. | |
| 6,206,613 B1 | 3/2001 | Elkins | |
| 6,450,736 B1 | 9/2002 | Eck et al. | |
| 6,502,791 B2 | 1/2003 | Parker | |
| 7,213,790 B2 * | 5/2007 | Bailey | F16L 3/1016 |
| | | | 248/65 |
| 2007/0187556 A1 | 8/2007 | Yoshitake | |
| 2011/0309207 A1 | 12/2011 | Senkpiel | |
| 2012/0181396 A1 | 7/2012 | Simmons et al. | |
| 2013/0048798 A1 * | 2/2013 | Bock | F16L 3/1091 |
| | | | 248/67.5 |
| 2013/0115009 A1 * | 5/2013 | Mebarkia | E21B 43/01 |
| | | | 405/171 |
| 2014/0021420 A1 | 1/2014 | Beelen et al. | |
| 2014/0346291 A1 * | 11/2014 | Booth | H02G 7/053 |
| | | | 248/74.4 |
| 2015/0239023 A1 * | 8/2015 | Iwata | C09D 5/16 |
| | | | 428/141 |

FOREIGN PATENT DOCUMENTS

| | | |
|---|---|---|
| CN | 201455598 | 5/2010 |
| CN | 101975312 | 2/2011 |
| CN | 201884790 | 6/2011 |
| CN | 201884792 | 6/2011 |
| CN | 202302330 | 7/2012 |
| CN | 202992525 | 6/2013 |
| CN | 203092062 | 7/2013 |
| CN | 103307364 | 9/2013 |
| CN | 103398234 | 11/2013 |
| CN | 203273194 | 11/2013 |
| CN | 103574173 | 2/2014 |
| CN | 103807570 | 5/2014 |
| CN | 203585572 | 5/2014 |
| CN | 104048104 | 9/2014 |
| CN | 104110527 | 10/2014 |
| CN | 203948785 | 11/2014 |
| CN | 203979646 | 12/2014 |
| CN | 203979658 | 12/2014 |
| CN | 104653871 | 5/2015 |
| CN | 104653875 | 5/2015 |
| CN | 104653952 | 5/2015 |
| CN | 204493888 | 7/2015 |
| CN | 105240623 | 1/2016 |
| DE | 3426968 | 1/1986 |
| DE | 9405929 | 6/1994 |
| EP | 1398552 | 3/2004 |
| GB | 426415 | 4/1935 |
| RU | 2253790 | 6/2005 |
| RU | 64315 | 6/2007 |
| RU | 64316 | 6/2007 |
| RU | 65164 | 7/2007 |
| RU | 65167 | 7/2007 |
| RU | 2335685 | 10/2008 |
| RU | 85974 | 8/2009 |
| RU | 99015 | 11/2010 |
| RU | 119057 | 8/2012 |
| RU | 120180 | 9/2012 |
| RU | 124350 | 1/2013 |
| RU | 127853 | 5/2013 |
| RU | 128274 | 5/2013 |
| RU | 2499940 | 10/2013 |
| RU | 2572428 | 9/2015 |
| SU | 556273 | 4/1977 |
| SU | 1099172 | 6/1984 |
| WO | WO2011/145983 | 11/2011 |
| WO | WO2015/147682 | 10/2015 |

OTHER PUBLICATIONS

Piping Technology and Products, Pipe Supports Catalog; *U-Bolt Cradle Support with Guide and Slide Plate* (Fig. 800); http://web.archive.org/web/20120602203447/http://www.pipingtech.com/

(56) References Cited

OTHER PUBLICATIONS products/ptpcat/pipeshoes/nofw/fig800.htm ; Printed Jul. 21, 2016 (1 page).
Piping Technology & Products, The Pipe Supports Blog; *Pipe Anchors*; http://www.pipingtech.com/blog/tag/pipe-anchors/ ; (6 pages).

* cited by examiner

2

MOVABLE PIPELINE-SUPPORT AND SUPPORT ASSEMBLY THEREOF

CROSS-REFERENCE TO RELATED APPLICATIONS

This application claims the benefit and priority of PCT Pat. App. No. PCT/RU2014/000216, titled MOVABLE PIPELINE-SUPPORT AND SUPPORT ASSEMBLY THEREOF and filed on Mar. 28, 2014, also published as WO/2015/147681.

FIELD

The invention is directed to movable supports for above-ground pipelines that are installed to allow free movement of pipelines in response to thermal strains, potential hydraulic impacts, and relative movement of the earth.

BACKGROUND

U.S. Pat. No. 4,128,219, filed on May 17, 1976 discloses a "freely-movable support", that allows a longitudinal and transverse movement of piping caused by thermal contraction and expansion. The support is formed by crisscrossed vertical and horizontal supporting rod elements having a dismountable connection. This provides the possibility of adjusting the relative position of the pipeline. The pipeline is covered by rigid clamps fixed to the movable horizontal support elements. The design of the support and support assembly provides the ability to adjust the position of the pipeline many times with its quite rigid fixation.

The disadvantages of the known solutions include a relatively large number of connections, ties and fasteners, screws and nuts for height adjustment. This creates certain limitations of use of the supports, and presents challenges in performing preventive maintenance and inspection of the support. The support design includes a large number of areas that are difficult to inspect. Thus, if any repair is required, disassembly of the support is likely required. Additionally, the absence of a rigid connection between piles may result in damage or separation of piles if the soil heaves or otherwise moves.

A similar solution is described in RF patent No. 128274 titled "SUPPORT FOR PIPELINE WITH GRADE." According to this reference, a support includes a pipeline half-yoke, a base plate and stand that are movably interconnected, and a cradle having a body mounted on the stand in such a way that the cradle can move relative to the stand.

The main disadvantage of this design is that the sliding surface of the stand has an inclined orientation. This increases the load on the pipeline during operation when installed on ground having a slope. In addition, the design does not allow for constraint of movement of the stand, which creates a risk of displacement beyond the amount determined using the design.

RF patent No. 64316 discloses a longitudinally movable support pipe which is the nearest analog of the present invention. This reference discloses a cradle with clamps covering a pipeline, along with a base plate with hinges. A stand is attached to the cradle and installed on the hinges. Side cheeks of the stand are beveled to allow tilting of the cradle relative to the base plate. A support with a plate is installed on a prepared site. The pipe is put down on the cradle and fixed with clamps. The location of a free standing plate (tower base) on the support allows free movement of the pipe. A short stand with hinges further allows the support to adapt to the location.

This support moves with the pipeline on the platform. In response to an increase in length of the pipeline (such as due to temperature changes), increased loads from friction between the plate and the pilework supporting surface affects the pipeline. In addition, the lack of friction pads between the cradle and the insulated pipe may result in damage to a jacket and insulation of the pipe.

The object of the present disclosure is to provide a reliable and functional support that reduces a risk of deformation of the pipeline in difficult geological conditions (i.e., environments associated with extremely low temperatures and potential heaving of permafrost).

The technical result of the disclosure is a uniform distribution of the pipeline load on the bedding cradle, the potential relative movement of a movable part of a pipeline support in specific conditions, a reduction of the likelihood of deformation caused by soil heaving, and compensation for potential deformation of the unit on a pile of the hinged type.

SUMMARY

The set object is solved using a movable pipeline support that includes moving and fixed parts. In this case, the moving parts include a cradle made in the form of a semi-cylinder, at least with two semi-annular stiffeners (frames) located on the outside of the cradle, and detachable half-yokes that fix the pipe in the cradle. The movable parts also include side cheeks that are rigidly welded to the frame and movably fixed to a tower base by a hinge joint. The base is made capable of sliding along a stationary surface of the support. When manufacturing a movable support with four frames, the frames are placed at an equal distance from each other, such as at the ends of the cradle. The hinged joint is equipped with anti-friction bushings that insulate the hinge elements from corrosion, reducing load from the friction and increasing the durability of the unit. The tower base is a flat surface that includes anti-friction corrosion-resistant spacers, such as plates made of modified fluoropolymer or thermoplastic material based on polyethylene and having anti-friction properties. The ends of the tower base are upwardly bent to form sidesteps. Friction pads are placed between the half-yokes and pipeline and between the cradle and the pipeline. The friction pads may be made of, for example, siloxane, which provides electrical isolation of the pipeline from a pile foundation to minimize the corrosion processes, and protects the pipeline jacket from damage in response to movement relative to the support.

The fixed part of the support can be made for either a two-piled or a four-piled foundation.

For the two-piled foundation, the fixed part of the support includes a pilework table that is made of interconnected beams, headers and rails. The base plate having the sliding surface is placed on the table. Furthermore, the pilework table is fixed to the pile foundation via two hinged supporting assemblies.

For the four-piled foundation, the fixed part of the support is a pilework table having a base plate with a sliding surface mounted on longitudinal beams (longitudinally located relative to the axis of the pipeline). The longitudinal beams are fixed to the pile foundation via four hinged supporting assemblies.

Side stops are rigidly fixed, e.g. by welding, on the base plate and spaced apart by a distance, potentially allowing a predetermined transverse displacement of the support movable part and deviation of the mounting supports and the installation of the pipeline. The sliding surface of the base plate is formed using a corrosion-resistant steel sheet, which is reinforced on the base plate.

The objective is also solved due to a structurally different performance of the supporting assembly. The supporting assembly includes a bearing sleeve installed freely about a pile foundation and two half rings rigidly welded to the pile foundation with a gap therebetween. A support plate having a hole corresponding to the inner diameter of the sleeve is connected with the sleeve using vertical rails and a horizontal stiffeners that increase the rigidity of the supporting assembly. The pilework table can be mounted rigidly on the base plate by welding, or may be mounted semi-rigidly by using a bolted connection with a gap which ensures the flexibility of the connections that are desirable when soil heaving (i.e., drawdown) occurs under the pile foundation. The half-rings are fixed to the pile with the technological gap between the ends of the half rings. The gap between the inner diameter of the sleeve and the outer diameter of the piles is at least 8 mm. In other words, the gap between the inner diameter of the sleeve and the outer diameter of the piles allows lifting (or lowering) of the sleeve relative to the pile in case of possible soil heaving (drawdown) up to 400 mm. The width of the half-ring (defined as the difference between the external and internal diameter) corresponds to a sum of the thickness of the sleeve (defined as the difference between its outer and inner diameter) and the size of the gap between the sleeve and the pile.

BRIEF DESCRIPTION OF DRAWINGS

The features, nature, and advantages of the present disclosure will become more apparent from the detailed description set forth below when taken in conjunction with the drawings, in which like reference characters are used to identify like elements correspondingly throughout the specification and drawings.

DETAILED DESCRIPTION

The drawings include the following elements, indicated by the corresponding reference numbers:
The movable part—the cradle body includes:
1.—cradle;
2.—half-yokes;
3.—frames (stiffeners);
4.—hinged joint;
5.—bolted joint;
6.—side cheeks;
7.—anti-friction pads;
17.—dielectric friction material;
8.—tower base sidestep; and
9.—tower base.
The fixed part of the support includes:
10.—pilework table;
11.—supporting sleeve;
12.—half-rings;
13.—support plate of the support sleeve with the hole;
14.—side stops;
15.—longitudinal beam; and
16.—pile (not part of support).

Figure 3:
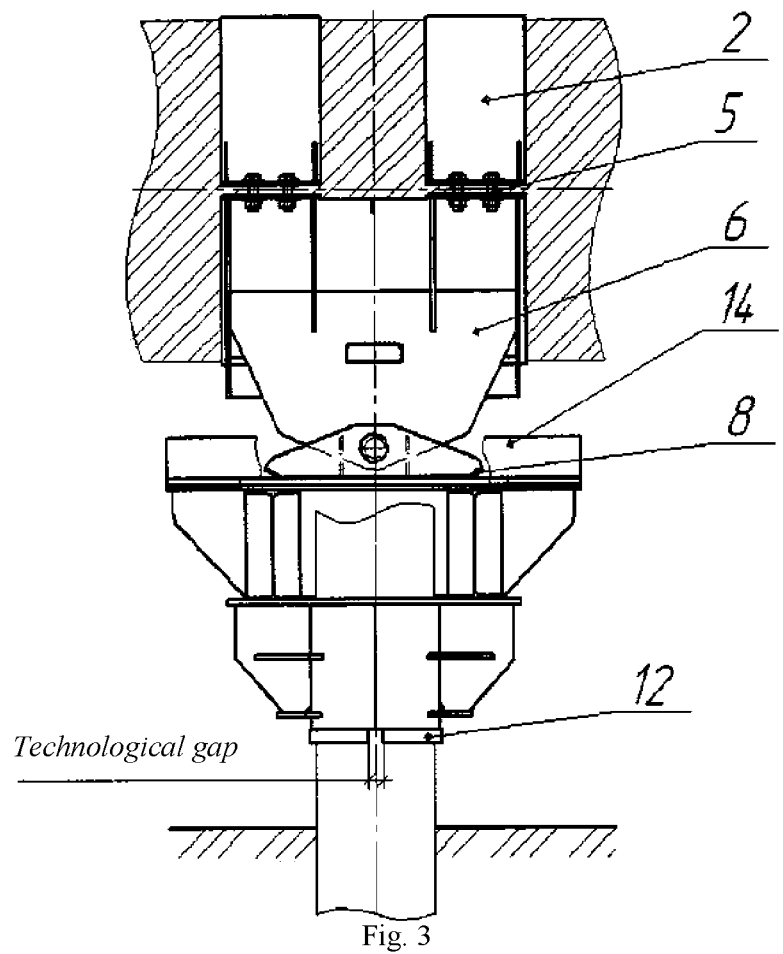
FIG. 3 illustrates a side view of the pipeline support for a two-piled foundation.

The movable support relates to a class of sliding supports and includes movable and stationary parts interacting with each other. In particular, the movable part may slide on the surface of the fixed part. The movable part of the pipeline support is a complex framework, having a semi-cylindrical cradle 1 for positioning the supported insulated pipe. The cradle 1 is reinforced with frames 3 made in the form of flat half-rings. The framework uses two or more frames. FIG. 3 shows the structure of a movable support having four frames placed at an equal distance from each other. The frames are fixed on the ends of the cradle 1. The width of the half-ring frame depends on the pipeline diameter and calculated loads.

All contact surfaces of the semi-cylindrical cradle 1 are provided with an electrically insulating friction material 17 made of, for example, siloxane. Two half-yokes 2 are detachably attached, using a bolted connection 5, to the ends of the cradle 1 for fixing the pipeline on the cradle 1. The inner surface of the half-yokes is also provided with an electrically insulating friction material 17 made, for example, of siloxane. Side cheeks 6 are rigidly attached (by welding) to the cradle 1 and form the backbone of cradle. The side cheeks 6 are plates fixed by horizontal welds to the cradle 1 on either side of the pipeline. The frames 3 are welded to the side cheeks 6 for strengthening and hardening of the entire support device. The frames 3 in this case also tighten the side cheeks 6. The shape of the plates contributes to hardening of the support structure. The side cheeks 6 are movably mounted on two hinges, which are positioned on and coupled to the tower base 9 and welded to the two lateral cheeks 6. The hinges 4 are equipped with anti-friction bushings for preventing jamming of the hinges 4 and providing corrosion resistance.

The tower base 9 is a flat surface provided with anti-friction, corrosion-resistant pads 7 made, for example, of plates of modified fluoropolymer. The ends of the tower base 9 are upwardly bent to form sidesteps 8, which increase the stiffness of the tower base 9 in the transverse direction. The sidesteps 8 are designed to prevent clogging of the movable part of the support when shifting, such as when snow cover and ice is formed on the pilework support surface. The tower base 9 has holes to prevent the accumulation of rainwater. The movable part of the support is installed with its tower base 9 on the surface of the fixed part of the support without any mutual attachment.

The fixed part of the support includes a pilework table 10 and components used to attach it to the pile foundation. When mounting the pile foundation of the support on four piles, longitudinal beams are used. The longitudinal beams function as supporting elements of the pilework. They mutually connect with adjacent piles, which lie parallel to the axis of the pipeline. The pilework table 10 is made in the form of a single level of two interconnected beams rigidly connected in the same plane and reinforced with rigid, vertically-oriented scarves and jumpers.

Figure 4:
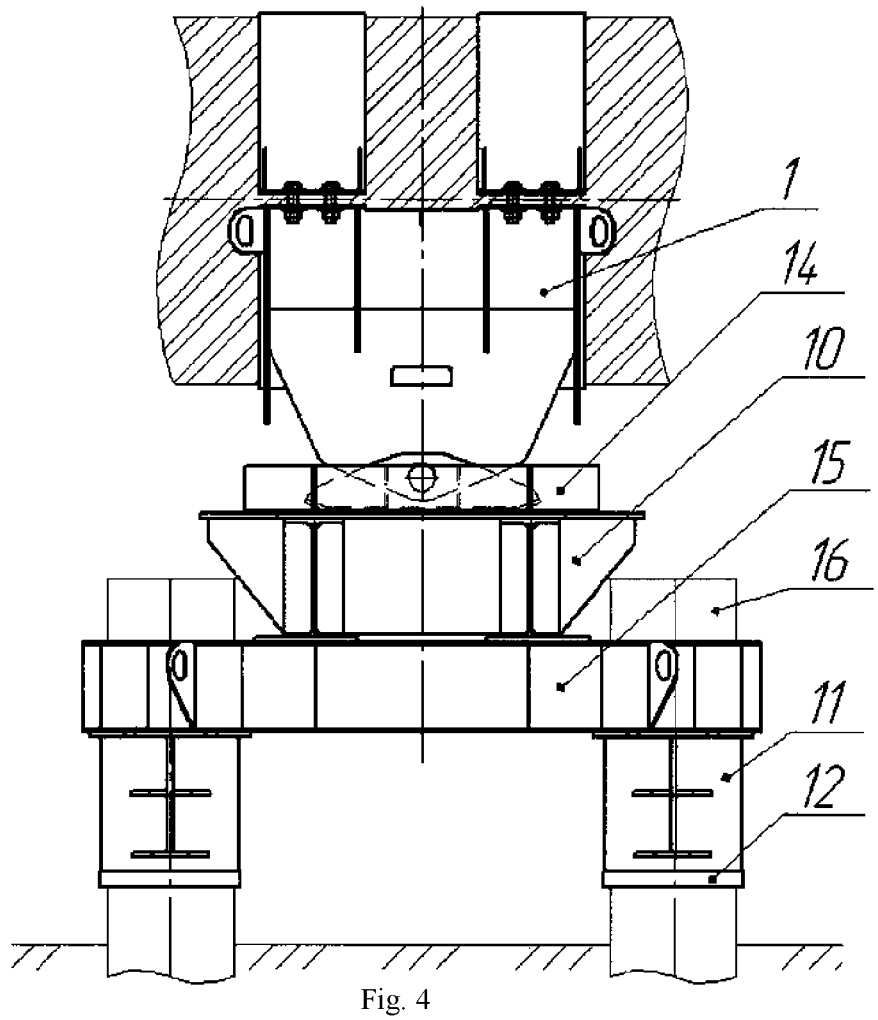
FIG. 4 illustrates a side view of the pipeline support for a four-piled foundation having longitudinal beams.
Figure 5:
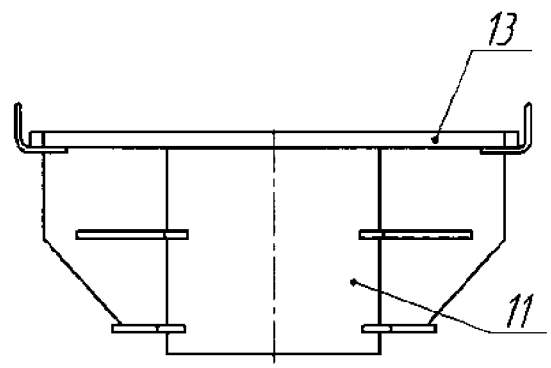
FIG. 5 is a schematic drawing illustrating an image of a supporting sleeve.
Figure 6:
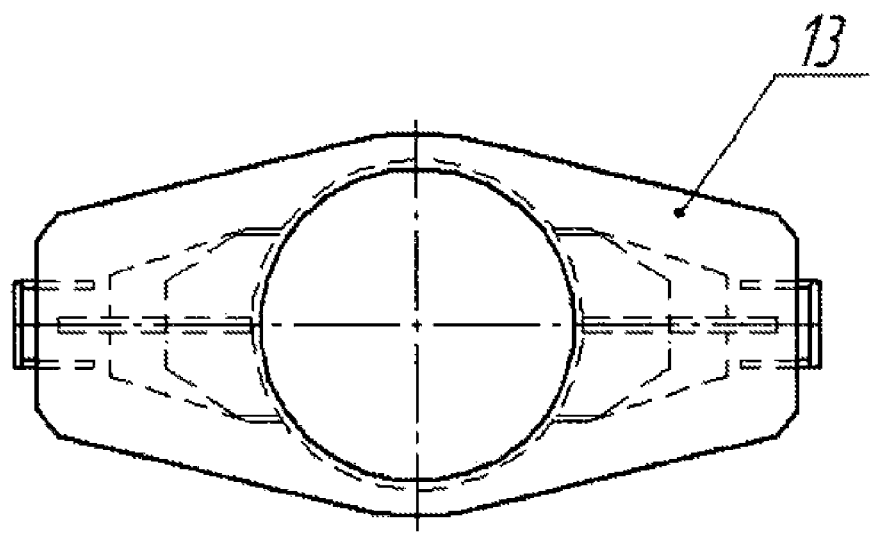
FIG. 6 shows a view of the base plate of the sleeve with the hole.
Figure 7:
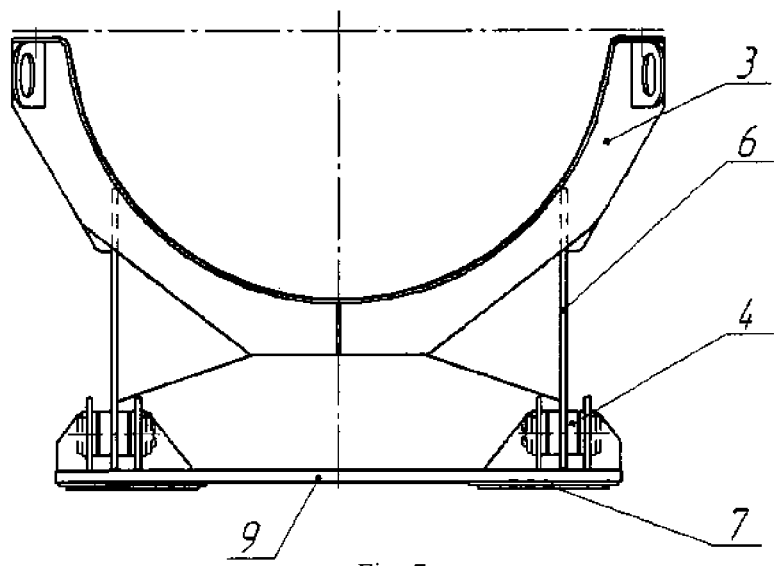
FIG. 7 is a schematic drawing illustrating an image of a movable part of a support, i.e., a cradle body of the pipeline support.

When using a two-pile foundation (shown in FIG. 2), the pilework table 10 is mounted directly on the foundation piles. In the case of using a four-pile foundation (shown in FIG. 4) the pilework table 10 is mounted on the foundation through two longitudinal beams 15, which connect the two piles 16 on each side and are fixed to the piles through the supporting assembly via a hinged type connection. The pilework table 10 is covered with a support plate having an upper surface on which the base of the movable part of the support may move or slide. The base plate may be made of a corrosion resistant steel sheet, made for example of steel 08H18N10.

The choice of foundation type is based on the load-bearing capacity of the soil and is determined at the pipeline design stage.

Figure 1:
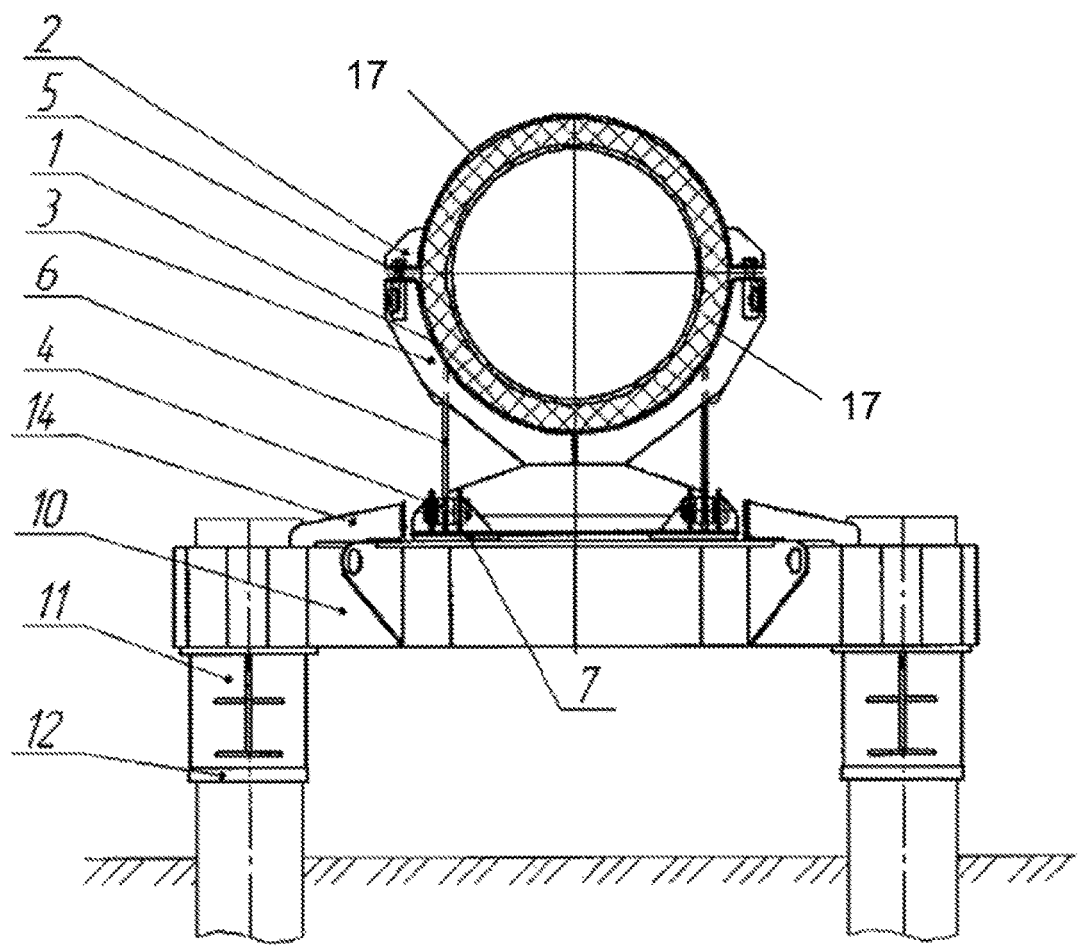
FIG. 1 is a schematic drawing illustrating a view of a pipeline support along an axis of a pipeline characterized by a position of side stops in the vicinity of a base (i.e., the support is a longitudinally-movable support).
Figure 2:
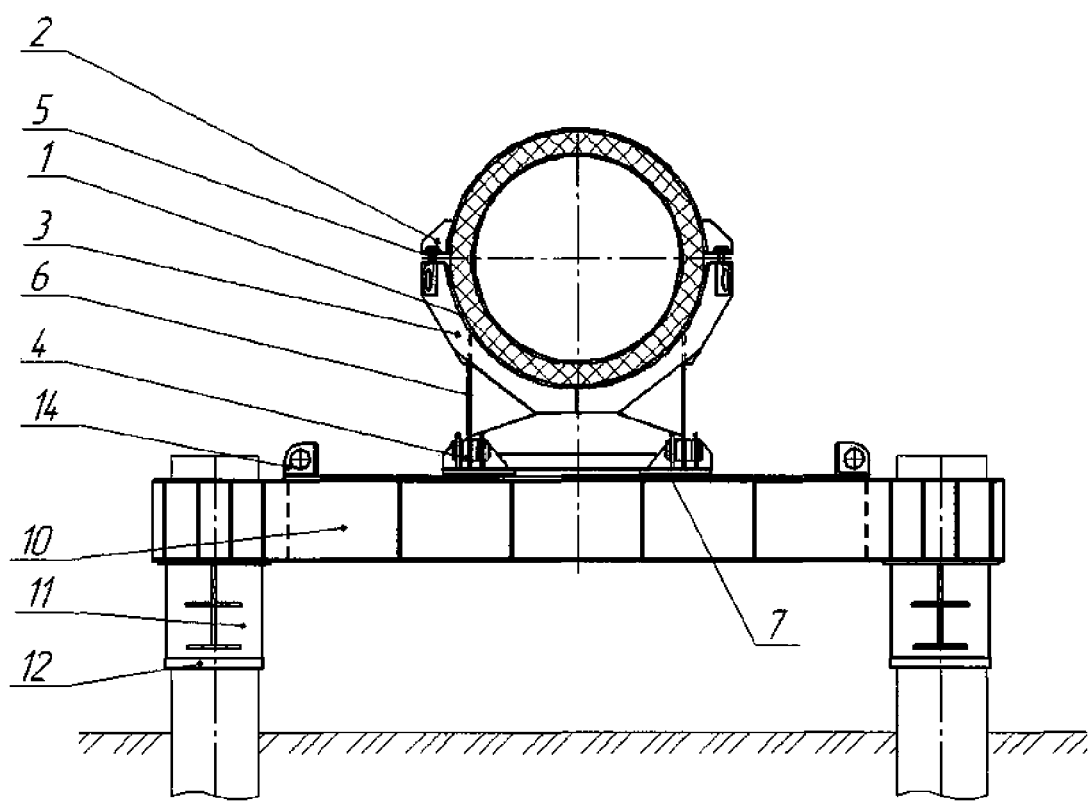
FIG. 2 is a schematic drawing illustrating a view of a pipeline support along an axis of a pipeline characterized by a position of side stops at a certain distance from the base (i.e., the support is a freely-movable support).

The side stops—limiters 14—are fixed on the surface of the pilework base plate, and their position may be changed by an operator. The top surface of the limiters 14 may be angled relative to the geometric axis of the pipeline. Mounting the side stops directly near the base at the sides by a distance of not more than 50 mm limits the possibility of transverse displacement of the moveable part, allowing only a longitudinal movement of the moveable part (FIG. 1 shows a longitudinally movable support). Accordingly, mounting of the side stops 14 farther from the base 9 provides the possibility of transverse displacement of the base 9 over the surface of the pilework base plate 13 (FIG. 2 shows a freely-movable support).

The prior art discloses the rigid attachment of a pilework to piles. In response to soil heaving or drawdown, deformation of metal structures can occur, causing damage to pilework weld joints, and the support may potentially fall. The claimed invention presents a supporting assembly where the pilework is connected to the foundation in a different manner, which provides a strain-free condition of a pipeline support when the vertical position of the pile is changed by up to 400 mm.

The supporting assembly includes two identical metal half-rings 12, rigidly welded together on one end to form a portion of a circle and positioned vertically on the piling. The half-rings 12 do not form a full ring after welding, a technological gap of about 30 mm remains between them. The gap compensates for deviation of the diameter of the piles. The height of the half-rings 12 is selected to reduce thermal influence of the neighboring welded joints (upper and lower) and to ensure the strength of the half-rings 12. The supporting sleeve 11 is loosely fitted on the half-rings 12 with a gap relative to the pile. The gap is not less than 8 mm. At the same time, the sleeve 11 is selected in a way that its thickness, along with the size of the gap, corresponds to the width of the half-ring. The base plate 13 is welded to the upper end of the sleeve 11 with a hole corresponding to the inner diameter of the sleeve 11. The connection of the plate 13 to the sleeve 11 is reinforced with at least two vertical gussets reinforced by horizontal ribs. The pilework table 10 is installed and rigidly welded to the sleeve supporting plates. This operation is performed during the installation of the support.

Thus, a rigid connection between the pile foundation and the pilework table 10 is made by fastening of the half-rings 12 to the piles 16. The supporting assembly performs the function of a hinge, not a rigid coupling. This compensates for possible deformations of the piles and workability of the movable support.

The claimed design works as follows. During the installation of the above-ground pipelining, the support structures are arranged based on the soil quality, its slope, etc.

The heat insulated pipeline is put into the cradle 1, fixed with the two half-yokes 2 with bolt connection 5, and installed in the design position. The inner surface of the cradle 1 and half-yokes 2 is provided with a dielectric friction material 17, for example, siloxane. Due to the presence of the hinged joint 4 between the cradle side cheeks 6 and the base 9, the pipeline is self-positioned in a location that is defined by the profile of the track. Anti-friction pads allow smooth tilt of the cradle 1 with the pipeline, along with corrosion resistance and durability of the unit. After installation, the pipeline is ready for operation. Regular changes of the transported processing medium temperature, vibration, and pressure changes inside the pipeline may result in constant, often significant (up to 600 mm) pipeline displacements.

Using the movable support of the disclosure, when pipeline displacements are experienced by the support, the movable part with the pipeline fixed therein is shifted. The base 9 may shift, sliding on the surface of the pilework base plate. The presence of the anti-friction pads and a corrosion-resistant pilework base surface allows the base 9 to move unhindered. This provides a significant (up to three times in case of application of not corrosion-resistant steels for friction pair) reduction of horizontal loads on piles and the pipeline due to friction forces. When placing side stops close to the base (to limit lateral movement), the base of the cradle may not slide transversely and is thus moved in the longitudinal direction.

In response to soil heaving or moving downwards, the vertical position of the piles may change. This can lead to deformation of the support, fracture of the welded joints with the pile, and a risk of the pipeline failure. The disclosed supporting assembly compensates for any such deformation due to the lack of a rigid connection with the pile. This is due to the presence of the gap between the pile and the inner diameter of the coupling. The free (no hard links) bearing of the coupling on the half-rings (which are welded to the pile) allows the pilework support surface to tilt in response to a vertical position of opposite piles tilting in different directions. The friction pads between the cradle and the pipe help to prevent damage to the heat insulation and jacket of the pipe in response to a change in incline of the pilework.

The invention claimed is:

1. A movable pipeline support comprising:
   a movable section including:
      a cradle having a semi-cylindrical shape,
      at least two frames in the form of half-rings welded to an outside of the cradle,
      detachable half-yokes usable to fix the pipeline in the cradle,
      a tower base, wherein the tower base has a flat lower surface having at least one anti-friction corrosion-resistant pad attached thereto and ends that are upwardly bent towards the cradle to form sidesteps, and
      side cheeks welded to the at least two frames, each of the side cheeks rigidly coupled to the cradle and movably coupled to the tower base via a hinged joint,
      a dielectric friction material positioned on an interior of the half-yokes and the cradle; and
   a fixed section including:
      a pile foundation, and
      a pilework table slidably coupled to the pile foundation, and a base plate coupled to the pilework table and having a surface on which the tower base is free to slide.

2. The movable pipeline support of claim 1, wherein the hinged joint includes anti-friction bushings to protect components of the hinged joint from corrosion and to reduce friction.

3. The movable pipeline support of claim 1, wherein the anti-friction corrosion-resistant pads include a modified fluoropolymer.

4. The movable pipeline support of claim 1, further comprising side stops rigidly fixed to the base plate and positioned on outer ends of the base plate to limit transverse movement of the movable section, spaced apart by a distance that allows a predetermined amount of transverse movement of the movable section and adjustable in position.

5. The movable support of claim 1, wherein the dielectric friction material is made of siloxane.

6. The movable support of claim 1, wherein the surface of the base plate includes a corrosion-resistant steel sheet that is fixed on the base plate.

7. The movable support of claim 1, wherein the pile foundation includes four piles and the pilework table is mounted on longitudinal beams.

8. The movable support of claim 1, wherein the pile foundation includes two piles.

\* \* \* \* \*